(12) United States Patent
Jaradi et al.

(10) Patent No.: US 12,077,127 B2
(45) Date of Patent: Sep. 3, 2024

(54) EXTENDABLE SEATBELT BUCKLE (71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 343 days.

(21) Appl. No.: 17/462,338

(22) Filed: Aug. 31, 2021

(65) Prior Publication Data

US 2023/0065807 A1  Mar. 2, 2023

(51) Int. Cl.
*B60R 22/20* (2006.01)
*B60R 22/48* (2006.01)

(52) U.S. Cl.
CPC .......... *B60R 22/201* (2013.01); *B60R 22/48* (2013.01); *B60R 2022/4816* (2013.01)

(58) Field of Classification Search
CPC .... B60R 2022/1806; B60R 2022/4816; B60R 22/19; B60R 22/201; B60R 22/48
See application file for complete search history.

(56) References Cited

U.S. PATENT DOCUMENTS

| 4,564,219 | A | * | 1/1986 | Baden | B60R 22/201 |
| | | | | | 280/801.2 |
| 5,326,042 | A | * | 7/1994 | Nishizawa | B60R 22/4619 |
| | | | | | 280/806 |
| 6,230,088 | B1 | * | 5/2001 | Husby | B60R 21/01556 |
| | | | | | 280/801.1 |
| 6,447,012 | B2 | * | 9/2002 | Peter | B60R 22/343 |
| | | | | | 242/390.8 |
| 7,866,703 | B2 | * | 1/2011 | Spahn | B60R 22/195 |
| | | | | | 280/806 |
| 7,942,448 | B2 | * | 5/2011 | Odate | B60R 22/1951 |
| | | | | | 280/808 |
| 7,963,473 | B2 | * | 6/2011 | Clute | B60R 22/4676 |
| | | | | | 242/379.1 |
| 8,005,597 | B2 | | 8/2011 | Bolton et al. | |
| 9,139,161 | B2 | * | 9/2015 | Park | B60R 22/325 |
| 9,902,354 | B2 | | 2/2018 | Shimazu et al. | |
| 11,027,696 | B2 | * | 6/2021 | Abro | B60R 22/48 |
| 11,338,767 | B2 | * | 5/2022 | Ichida | B60R 22/28 |

(Continued)

OTHER PUBLICATIONS

Dipl-Ing Uwe Class, et al., "Active Seatbelt Buckle for Comfort and Safety," www.autotechreview.com, Dec. 2013, 5 pages.

*Primary Examiner* — Carl C Staubach
(74) *Attorney, Agent, or Firm* — Frank A. MacKenzie; Bejin Bieneman PLC (57) ABSTRACT A system includes a base. The system includes a buckle movable from a retracted position away from the base to an extended position. The system includes an actuator supported by the base and operatively coupled to the buckle to move the buckle to the extended position. The system includes a computer having a processor and a memory storing instructions executable by the processor to actuate the actuator to move the buckle to the extended position in response to determining that tension of a seatbelt webbing is above a predetermined threshold and that a vehicle impact has not been detected.

19 Claims, 6 Drawing Sheets

(56) References Cited

U.S. PATENT DOCUMENTS

| | | | | |
|---|---|---|---|---|
| 2002/0043872 A1* | 4/2002 | Townsend | ............... | B60R 22/26 |
| | | | | 297/473 |
| 2004/0217583 A1* | 11/2004 | Wang | ...................... | B60R 22/28 |
| | | | | 280/805 |
| 2008/0290644 A1* | 11/2008 | Spahn | ..................... | B60R 22/03 |
| | | | | 280/806 |
| 2012/0112503 A1* | 5/2012 | Masutani | ........... | B60N 2/42754 |
| | | | | 297/216.1 |
| 2014/0132056 A1* | 5/2014 | Yilma | .................... | B60R 22/20 |
| | | | | 297/481 |

* cited by examiner

EXTENDABLE SEATBELT BUCKLE

BACKGROUND

A vehicle may include a seatbelt assembly. The seatbelt assembly may include a seatbelt retractor and webbing retractably payable from the seatbelt retractor. The seatbelt assembly may include an anchor coupled to the webbing, and a clip that engages a buckle. The seatbelt assembly may be disposed adjacent a seat of the vehicle. The webbing may extend continuously from the seatbelt retractor to the anchor. For example, one end of the webbing feeds into the seatbelt retractor, and the other end of the webbing is fixed to the anchor. The anchor may, for example, be fixed to the seat. Alternatively, the anchor may be fixed to a vehicle body, e.g., a B-pillar, a floor, etc. The anchor may be attached in any suitable manner, e.g., with fasteners. The webbing may be fabric, e.g., woven nylon. The clip slides freely along the webbing and, when engaged with the buckle, divides the webbing into a lap band and a shoulder band. The seatbelt assembly may include a D-ring engaged with the webbing. For example, the webbing may freely slide through the D-ring. In other words, the webbing may extend from the anchor through the D-ring to the seatbelt retractor. The D-ring may be spaced from the seatbelt retractor. For example, the D-ring may be disposed between the seatbelt retractor and the roof. As another example, the seatbelt retractor may be adjacent to the floor and the D-ring may be adjacent to the roof. The D-ring may be fixed to the vehicle body, e.g., the B-pillar. The seatbelt assembly may be a three-point harness, meaning that the webbing is attached at three points around the occupant when fastened the anchor, the seatbelt retractor, and the buckle. The seatbelt assembly may, alternatively, include another arrangement of attachment points.

DETAILED DESCRIPTION

A system includes a base and a buckle movable from a retracted position away from the base to an extended position. The system includes an actuator supported by the base and operatively coupled to the buckle to move the buckle to the extended position. The system includes a computer having a processor and a memory storing instructions executable by the processor to actuate the actuator to move the buckle to the extended position in response to determining that tension of a seatbelt webbing is above a predetermined threshold and that a vehicle impact has not been detected.

The instructions may include instructions to actuate the actuator to move the buckle toward the base to the retracted position in response to detecting unbuckling of the buckle.

The instructions may include instructions to, after actuating the buckle to the extended position, wait a threshold amount of time and then actuate the actuator to move the buckle toward the base to the retracted position in response to determining that tension of the seatbelt is below the predetermined threshold.

The system may include a sensor supported at a seatbelt anchor connected to the seatbelt, and the instructions may include instructions to determine that tension of the seatbelt is above the predetermined threshold based on information received from the sensor.

The system may include an impact sensor, and the instructions may include instructions to determine that a vehicle impact has not been detected based on information from the impact sensor.

The actuator may include a rack and a pinion.

The rack may be slidably supported by the base and the pinion may be rotatably supported by the base.

The actuator may include a motor operatively coupled to the pinion.

The system may include a lock selectively inhibiting movement of the rack.

The lock may be an inertial lock.

The lock may be operatively coupled to the pinion.

The system may include a connecting member extending from the base to the buckle, and the rack may be fixed to the connecting member.

The rack and the connecting member may be unitary.

The base may be fixed to a seat bottom.

A system includes a base and a buckle movable from a retracted position away from the base to an extended position. The system includes an actuator including a rack and a pinion, the actuator supported by the base and operatively coupled the buckle to move the buckle to the extended position. The system includes a lock selectively inhibiting movement of the rack.

The lock may be an inertial lock.

The lock may be operatively coupled to the pinion.

The system may include a connecting member extending from the base to the buckle, and the rack may be fixed to the connecting member.

The rack and the connecting member may be unitary.

The system may include a computer having a processor and a memory storing instructions executable by the processor to actuate the actuator to move the buckle to the extended position in response to determining that tension of a seatbelt is above a predetermined threshold and that a vehicle impact has not been detected, the instructions including instructions to actuate the actuator to move the buckle toward the base to the retracted position in response to detecting unbuckling of the buckle.

With reference to FIGS. 1-4, where like numerals indicate like features throughout the several views, a vehicle 20 having a system 22 for decreasing tension of a seatbelt webbing 24 is shown. The system 22 includes a base 26 and a buckle 28 movable from a retracted position away from the base 26 to an extended position. The system 22 includes an actuator 30 supported by the base 26 and operatively coupled to the buckle 28 to move the buckle 28 to the extended position. The system 22 includes a computer 32 having a processor and a memory storing instructions executable by the processor to actuate the actuator 30 to move the buckle 28 to the extended position in response to determining that tension of the seatbelt webbing 24 is above a predetermined threshold and that a vehicle impact has not been detected. Movement of the buckle 28 to extended position may reduce tension in the seatbelt webbing 24, e.g., permitting disengagement of a seatbelt retractor 34 such that the webbing 24 is payable into and/or out of the seatbelt retractor 34, providing increased range of movement for an occupant, etc. Disengagement of the seatbelt retractor 34 and the resultant increased range of movement help to provide an improved occupant experience in situations where the seatbelt retractor 34 engages without the vehicle 20 experiencing an impact, e.g., locking of the seatbelt retractor 34 caused by the occupant leaning forward too quickly, the vehicle 20 being positioned on a steep decline, the vehicle 20 traversing a particularly bumpy surface, etc.

Figure 1:
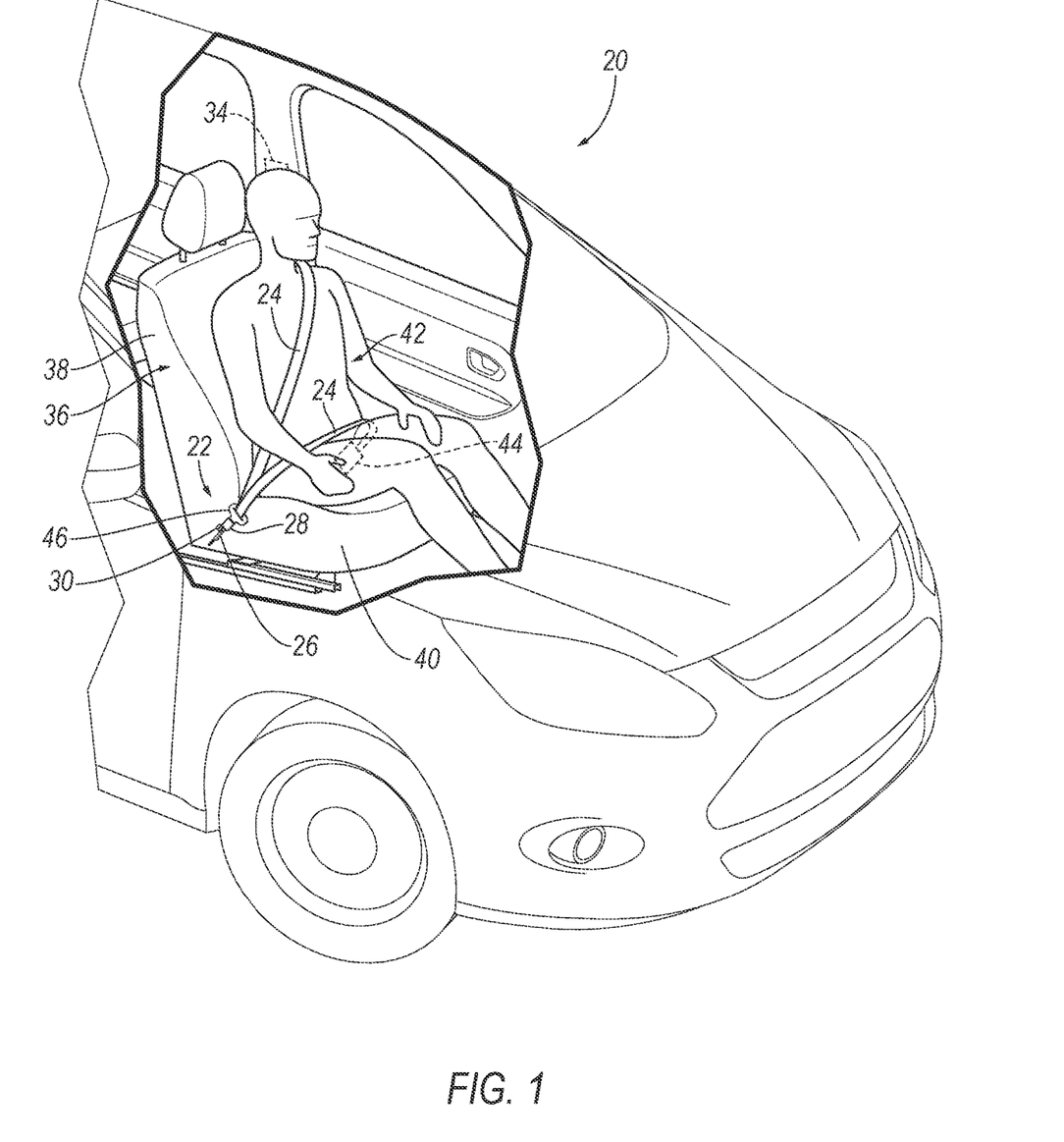
FIG. 1 is a perspective view of a seat and a seatbelt assembly in a vehicle.

The vehicle 20, shown in FIG. 1, may be any suitable type of ground vehicle 20, e.g., a passenger or commercial automobile such as a sedan, a coupe, a truck, a sport utility, a crossover, a van, a minivan, a taxi, a bus, etc.

The vehicle 20 includes one or more seats 36. The seats 36 may be arranged in the passenger cabin in any suitable position, i.e., as front seats, rear seats, third-row seats, etc. The seats 36 may be supported by a floor of the vehicle 20. The seats 36 may be movable relative to the floor to various positions, e.g., movable fore-and-aft and/or cross-vehicle. The seats 36 may be of any suitable type, e.g., a bucket seat 36.

Each of the seats 36 includes a seatback 38 and a seat bottom 40. The seatback 38 may be supported by the seat bottom 40 and may be stationary or movable relative to the seat bottom 40. The seatback 38 and the seat bottom 40 may be adjustable in multiple degrees of freedom. Specifically, the seatback 38 and the seat bottom 40 may themselves be adjustable, in other words, adjustable components within the seatback 38 and/or the seat bottom 40, and/or may be adjustable relative to each other.

One or more seatbelt assemblies 42 may be included in the vehicle 20 to control kinematics of occupants of the seats 36. Each seatbelt assembly 42 may include the seatbelt retractor 34. The seatbelt webbing 24 is retractably payable from the seatbelt retractor 34. The seatbelt assembly 42 may include an anchor 44 coupled to the webbing 24, and a latch plate 46 that engages the buckle 28. The seatbelt assembly 42 may be disposed adjacent the seat 36. For example, the seatbelt assembly 42 is shown adjacent the front seat 36. The seatbelt assembly 42 controls kinematics of the occupant of the respective seat 36, e.g., during sudden decelerations of the vehicle 20. The webbing 24 may extend continuously from the seatbelt retractor 34 to the anchor 44. For example, one end of the webbing 24 feeds into the seatbelt retractor 34, and the other end of the webbing 24 is fixed to the anchor 44. The anchor 44 may, for example, be fixed to the seat 36. Alternatively, the anchor 44 may be fixed to a body of the vehicle 20, e.g., the B-pillar, the floor, etc. The anchor 44 may be attached to the seat 36 in any suitable manner, e.g., with fasteners. The webbing 24 may be fabric, e.g., woven nylon. The latch plate 46 slides freely along the webbing 24 and, when engaged with the buckle 28, divides the webbing 24 into a lap band and a shoulder band. The seatbelt assembly 42 may include a D-ring engaged with the webbing 24. For example, the webbing 24 may freely slide through the D-ring. In other words, the webbing 24 may extend from the anchor 44 through the D-ring to the seatbelt retractor 34. The D-ring may be spaced from the seatbelt retractor 34. For example, the D-ring may be disposed between the seatbelt retractor 34 and the roof. As another example, the seatbelt retractor 34 may be adjacent to the floor and the D-ring may be adjacent to the roof. The D-ring may be fixed to the vehicle 20 body, e.g., the B-pillar. The seatbelt assembly 42 may be a three point harness, meaning that the webbing 24 is attached at three points around the occupant when fastened: the anchor 44, the seatbelt retractor 34, and the buckle 28. The seatbelt assembly 42 may, alternatively, include another arrangement of attachment points.

Figure 2:
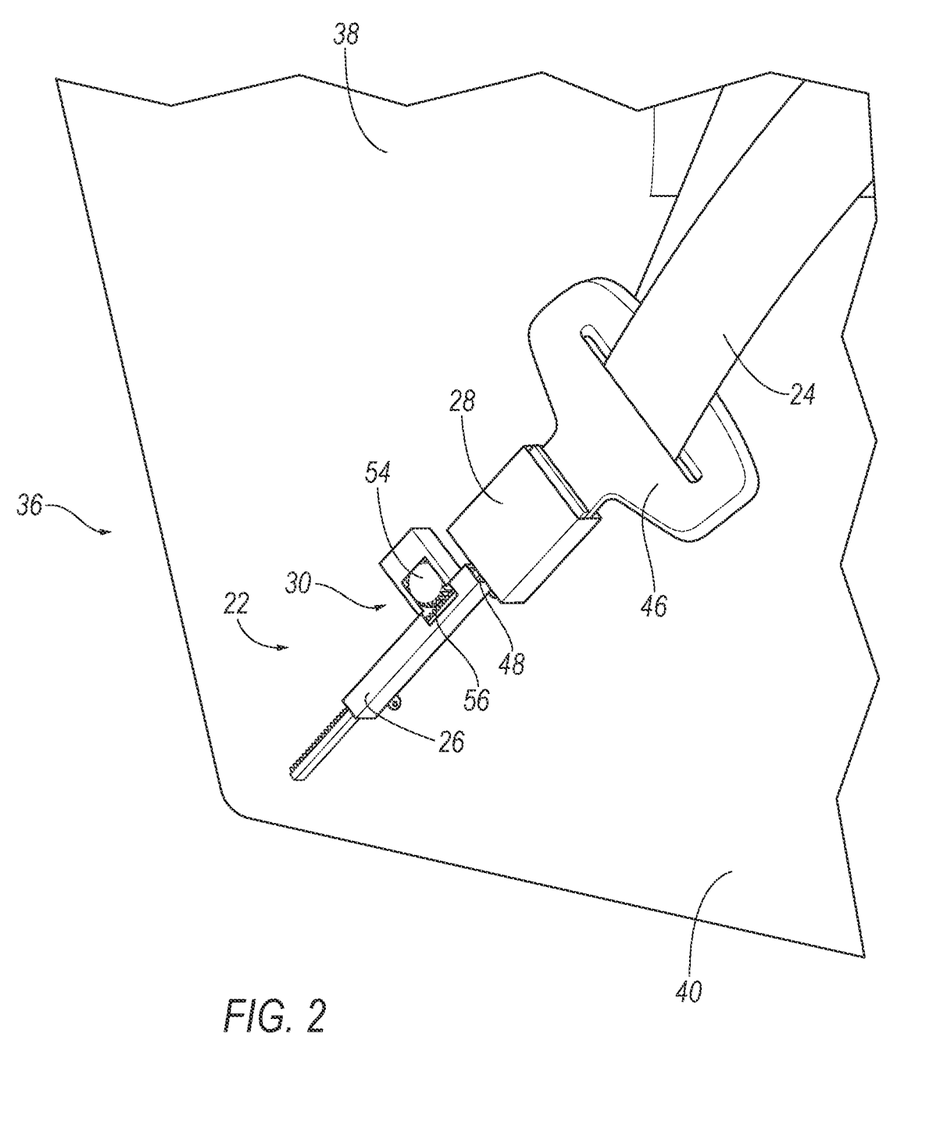
FIG. 2 is a perspective view of a buckle of the seatbelt assembly in a retracted position and attached to the seat.
Figure 4:
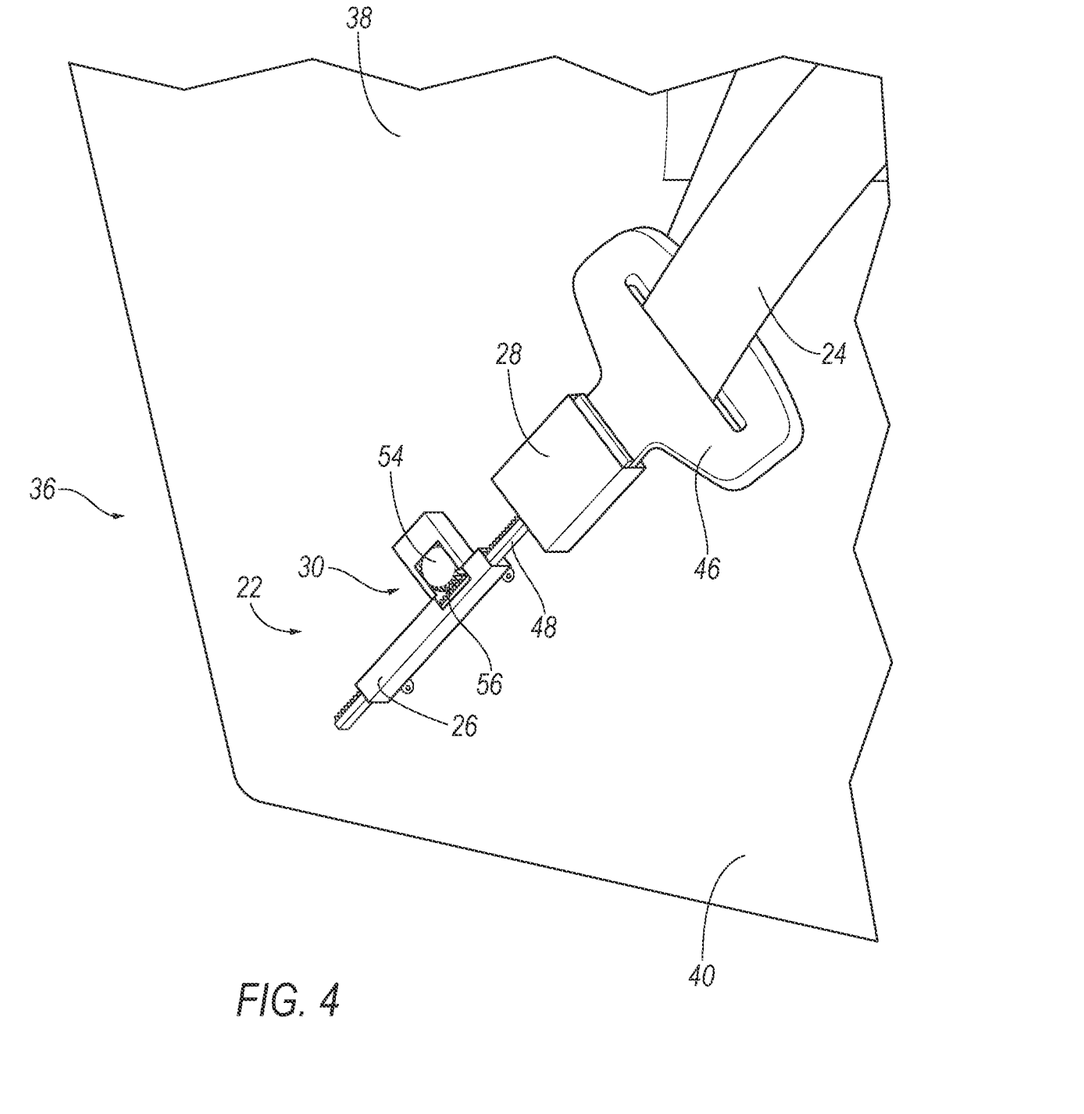
FIG. 4 is a perspective view of the buckle in an extended position and attached to the seat.

The buckle 28 is movable away from the base 26 from the retracted position, shown in FIG. 2 to the extended position, shown in FIG. 4, and vice versa. The buckle 28 in the extended position provides reduced tension to the seatbelt webbing 24, e.g., when the latch plate 46 is coupled to the buckle 28 and compared to tension of the seatbelt webbing 24 when the buckle 28 is in the retracted position.

The base 26 may support the buckle 28 and house other components of the system 22, such as the actuator 30, a connecting member 48, etc. The base 26 is supported in the passenger cabin. For example, the base 26 may be fixed to the floor, the seat 36, or any other suitable structure. The base 26 is shown as being fixed to the seat bottom 40. The base 26 may be metal, plastic, or any suitable material.

The connecting member 48 connects the base 26 to the buckle 28. The connecting member 48 may extend from the base 26 to the buckle 28. The connecting member 48 may be supported by the base 26. The connecting member 48 may be slidable relative to the base 26 and immovably fixed to the buckle 28. In other words, the connecting member 48 and the buckle 28 may move in unison relative to the base 26. The connecting member 48 may be plastic, metal, or any suitable material. For example, the connecting member 48 may include a metal beam, cable, etc.

The actuator 30 is included in the system 22 for moving the buckle 28 from the retracted position to the extended position, and vice versa. The actuator 30 may include a motor 50 (shown in FIG. 3) or other suitable electro-mechanical structure coupled to the buckle 28. Rotation of a driveshaft 52 of the motor 50 in one direction may move the buckle 28 toward the extended position and rotation of the driveshaft 52 in an opposite direction may move the buckle 28 toward the retraced position. For example, and with reference to FIGS. 2-4, the actuator 30 can include a pinion 54 the motor 50 may be operatively coupled to the pinion 54 to rotate of the pinion 54 along with rotation of the driveshaft 52. The pinion 54 includes gear teeth extending about a perimeter of the pinion 54. The pinion 54 may be fixed to the driveshaft 52. The pinion 54 may be engaged with a rack 56 of the actuator 30, e.g., the gear teeth of the pinion 54 may be meshed with teeth of the rack 56. Rotation of the pinion 54 moves the rack 56 linearly, e.g., toward the extended position or the retracted position. The rack 56 may be fixed to the connecting member 48. The rack 56 and the connecting member 48 may be unitary. Unitary means a single, uniform piece of material with no seams, joints, fasteners, or adhesives holding it together, i.e., formed together simultaneously as a single continuous unit, e.g., by machining from a unitary blank, molding, forging, casting, etc. Non-unitary components, in contrast, are formed separately and subsequently assembled, e.g., by threaded engagement, welding, etc. The actuator 30 is supported by the base 26. For example, one or more components of the actuator 30, such the motor 50, may be fixed to the base 26. As another example, the pinion 54 may be rotatably supported by the base 26 and the rack 56 may be slidably supported by the base 26. In other words, the pinion 54 may be fixed to inhibit translation of the pinion 54 relative to the base 26 with rotation of the pinion 54 relative to base 26 permitted. The actuator 30 is operatively coupled to the buckle 28 to move the buckle 28 to the extended position. For example, movement of the rack 56 of the actuator 30 may concurrently move the connecting member 48 and the buckle 28 fixed thereto. The actuator 30 may include any other suitable mechanical and/or electromechanical structure suitable for moving the buckle 28, e.g., in response to a command from the computer 32.

Figure 3:
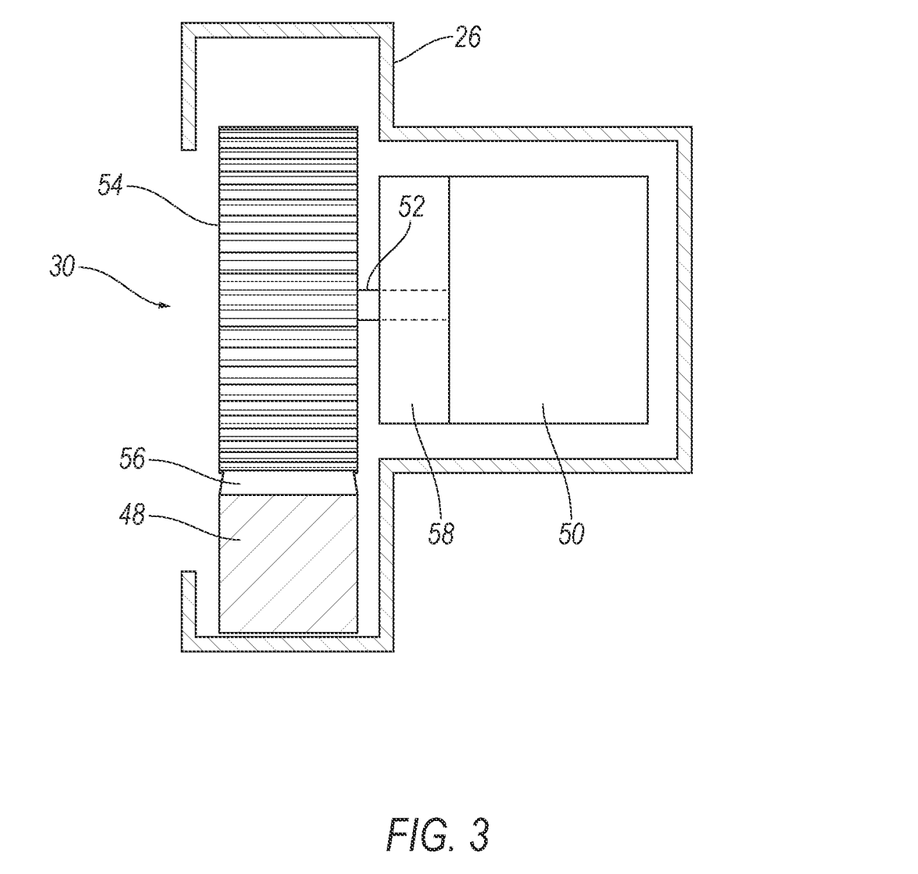
FIG. 3 is a cross section view of components of the seatbelt assembly.

With reference to FIG. 3, the system 22 can include a lock 58 that selectively inhibits movement of the rack 56 relative to the base 26. In other words, the lock 58 triggers to releasably lock the rack 56 relative to the base 26, e.g., upon sufficient application of force to the webbing 24 and/or sufficient deceleration of the vehicle 20. The lock 58 may unlock the rack 56 relative to the base 26 when the force is removed from the webbing 24. The lock 58 may be operatively coupled to the pinion 54 to inhibit movement of pinion 54 relative to the base 26 and thereby inhibit movement of the base 26. For example, the lock 58 may engage to inhibit rotation of the driveshaft 52 of the motor 50. The lock 58 may be an inertial lock 58 that is triggered by inertia of a component causing movement of such component to engage another component. For example, the lock 58 may include a weighted pawl that moves into engagement with teeth of the lock 58, e.g., upon sufficient deceleration of the vehicle 20 and inhibiting movement of the teeth. The lock 58 may include an activation sensor that senses sudden deceleration of the vehicle 20 and triggers activation of the lock 58, e.g., to engage the teeth and pawl. The activation sensor may be in communication with the pawl, either directly or indirectly through a controller. The activation sensor may be located in the base 26 or elsewhere in the vehicle 20. In the base 26, the activation sensor may be, for example a weighted pendulum, a centrifugal clutch, or any other suitable type. In the vehicle 20 outside the base 26, the activation sensor may be, for example, post-contact sensors such as accelerometers, pressure sensors, and contact switches; pre-impact sensors such as radar, lidar, and vision-sensing systems; or any other suitable type. The vision systems may include one or more cameras, CCD image sensors, CMOS image sensors, etc.

Figure 5:
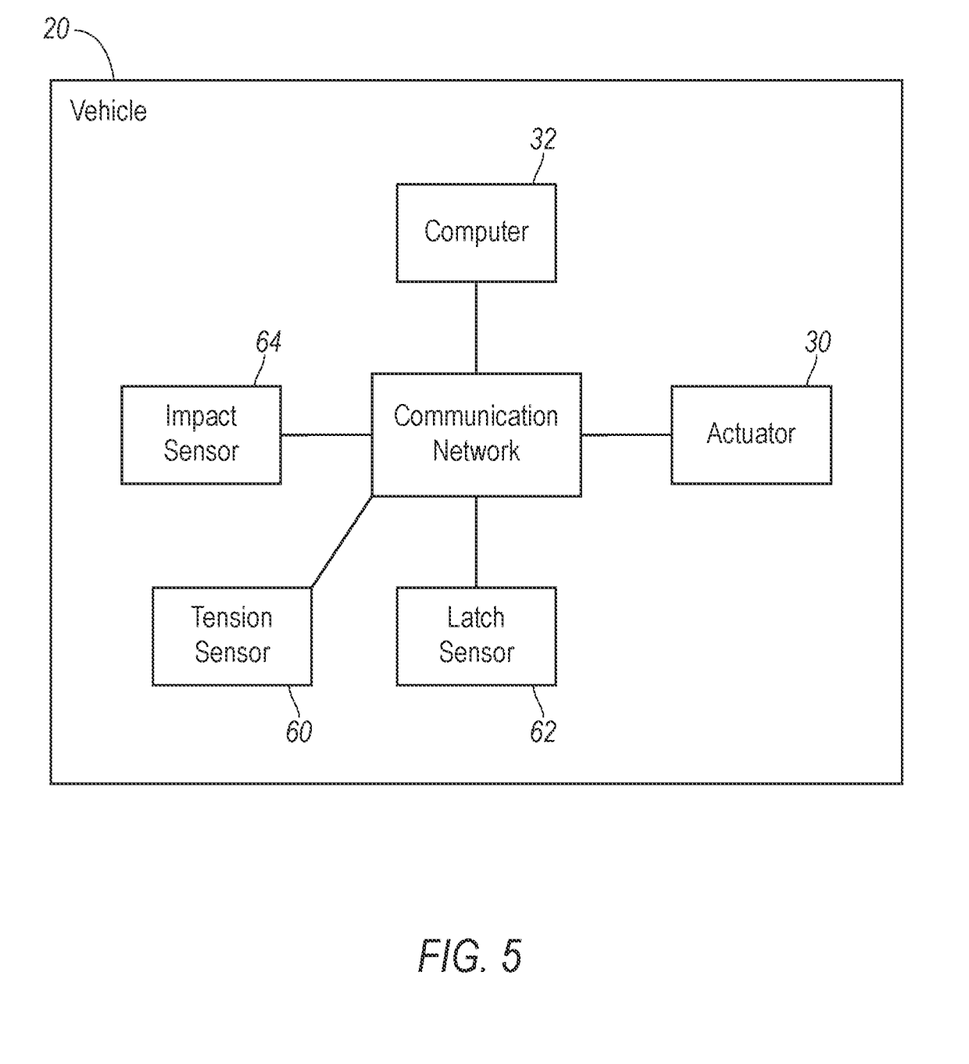
FIG. 5 is a block diagram of components of the vehicle.

With reference now to FIG. 5, the system 22 can include a tension sensor 60 that detects tension of the seatbelt webbing 24. The tension sensor 60 may include a strain gage, or other suitable structure. The tension sensor 60 can be supported at, e.g., fixed to, the seatbelt anchor 44 connected to the seatbelt webbing 24, or at any other suitable location. Tension of the seatbelt webbing 24 may generate strain in the anchor 44 and the tension sensor 60 may detect such strain.

The system 22 may include a latch sensor 62 that detects when the latch plate 46 is buckled, i.e., when the latch plate 46 is engaged with the buckle 28. The latch sensor 62 may be a switch, a proximity sensor, or any suitable sensor. The latch sensor 62 may be support by the buckle 28.

The system 22 can include an impact sensor 64 that is configured to detect an impact to the vehicle 20. The impact sensor 64 may be of any suitable type, for example, post-contact sensors such as accelerometers, pressure sensors, and contact switches; and pre-impact sensors such as radar, LIDAR, and vision-sensing systems. The vision-sensing systems may include one or more cameras, CCD image sensors, CMOS image sensors, etc. The impact sensor 64 may be located at numerous points in or on the vehicle 20.

The computer 32 includes a processor and a memory. The memory includes one or more forms of computer 32 readable media, and stores instructions executable by the computer 32 for performing various operations, including as disclosed herein. For example, the computer 32 can be a generic computer with a processor and memory as described above and/or may include an electronic control unit (ECU) or controller for a specific function or set of functions, and/or a dedicated electronic circuit including an ASIC that is manufactured for a particular operation, e.g., an ASIC for processing sensor data and/or communicating the sensor data. In another example, computer 32 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the computer 32. The memory can be of any type, e.g., hard disk drives, solid state drives, servers, or any volatile or non-volatile media. The memory can store the collected data sent from the sensors.

The computer 32 is generally arranged for communications on a communication network 66 that can include a bus in the vehicle 20 such as a controller area network (CAN) or the like, and/or other wired and/or wireless mechanisms. Via the communication network 66, the computer 32 may transmit messages to various devices in the vehicle 20, and/or receive messages (e.g., CAN messages) from the various devices, e.g., the various sensors, etc. Alternatively or additionally, in cases where the computer 32 comprises a plurality of devices, the communication network 66 may be used for communications between devices represented as the computer 32 in this disclosure.

The computer 32 is programmed to, i.e., the memory stores instructions executable by the processor to, determine whether the latch plate 46 is buckled or unbuckled from the buckle 28, e.g., based on data received from the latch sensor 62.

The computer 32 is programed to determine whether tension of the seatbelt webbing 24 is above a predetermined threshold based on information received from the tension sensor 60. The computer 32 may determine whether tension of the seatbelt webbing 24 is above the predetermined threshold by comparing tension specified by the tension sensor 60 with the predetermined threshold. The predetermined threshold may be based on empirical testing, e.g., indicating an amount of tension detected when an occupant is leaning on the webbing 24.

The computer 32 is programed to determine whether to determine whether a vehicle impact has been detected based on information from the impact sensor 64. For example, the computer 32 may determine an impact has occurred in response to receiving a signal from the impact sensor 64 indicating the impact. The computer 32 may determine an impact has not occurred based on a lack of signal from the impact sensor 64.

The computer 32 is programmed to actuate the actuator 30 to move the buckle 28 to the extended position. For example, the computer 32 may send a command to the actuator 30 via the communication network 66. The command may specify the extended position. The computer 32 may move the buckle 28 to the extended position in response to determining that tension of a seatbelt is above a predetermined threshold and that a vehicle impact has not been detected.

The computer 32 can actuate the actuator 30 move the buckle 28 to the retracted position, e.g., by sending a command specifying the retracted position to the actuator 30. The computer 32 may move the buckle 28 toward the base 26 to the retracted position in response to detecting unbuckling of the buckle 28. The computer 32 may, after actuating the buckle 28 to the extended position and waiting a threshold amount of time, move the buckle 28 toward the base 26 to the retracted position in response to determining that tension of the seatbelt is below the predetermined threshold.

Figure 6:
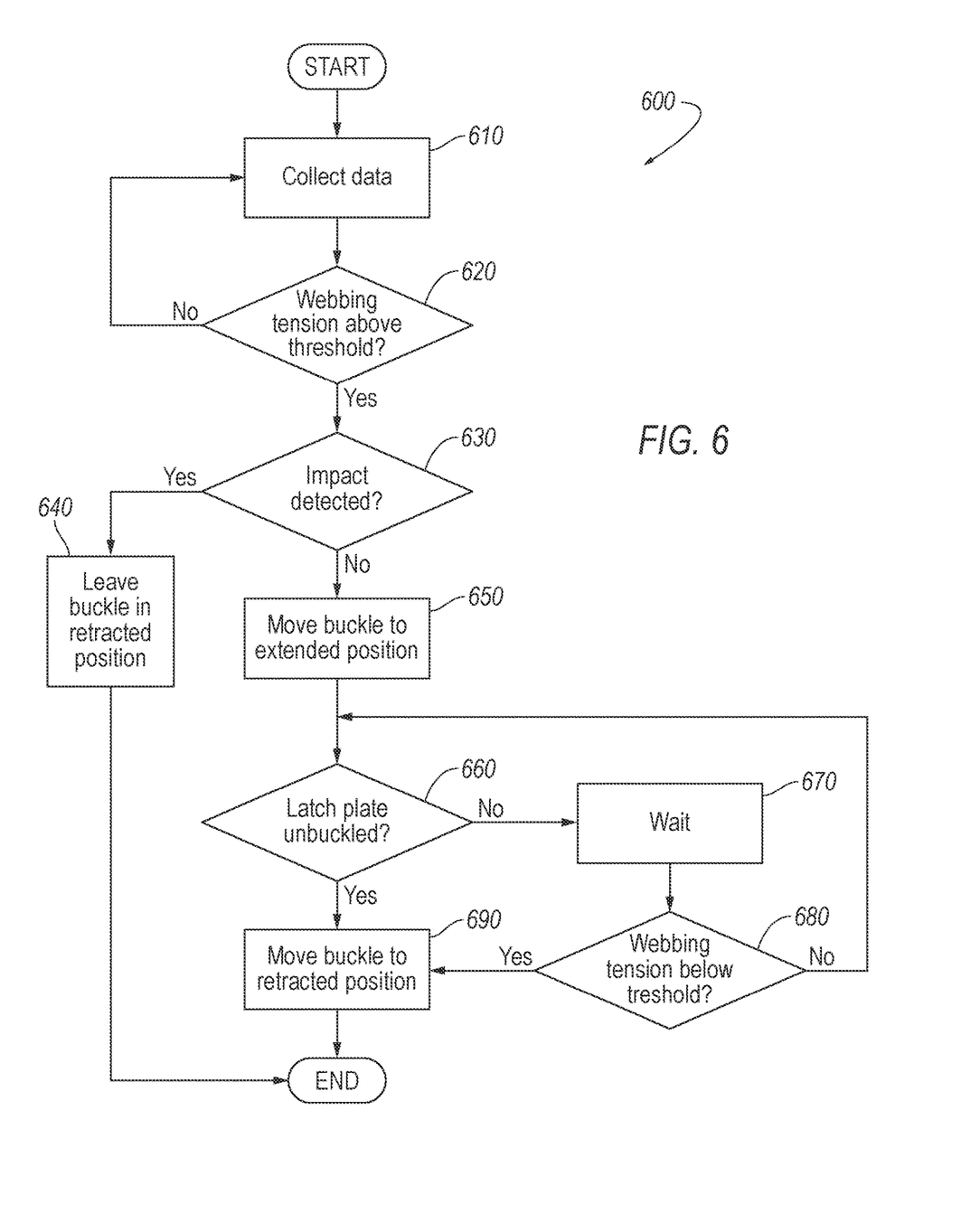
FIG. 6 is a flowchart illustrating a process for controlling the buckle between the retracted position and the extended position.

With reference to FIG. 6, a flow chart illustrating a process 600 for controlling the system 22 is shown. The process 600 starts with the vehicle 20 operating under typical conditions, e.g., with the latch plate 46 buckled into the buckle 28, with tension in the seatbelt webbing 24 below the threshold amount, with the buckle 28 in the retracted position, without having detected an impact to the vehicle 20, etc. At the initial block 610, the computer 32 collects data, e.g., from the buckle 28 sensor, the tension sensor 60, the impact sensor 64, etc., via the communication network 66. The computer 32 may collect such data continuously, at intervals (e.g., every 100 milliseconds), etc. The computer 32 may collect such data throughout the process 600.

Next and at a block, 620 the computer 32 determines whether tension of the seatbelt webbing 24 is above the predetermined threshold. For example, the computer 32 may compare the tension in the seatbelt webbing 24 indicated in the data collected by the tension sensor 60 at the block 610. Upon determining the tension of the seatbelt webbing 24 is above the threshold, the computer 32 moves to the block 630. Upon determining the tension of the seatbelt webbing 24 is above the threshold, the computer 32 moves to the block 630. Upon determining the tension of the seatbelt webbing 24 is not above the threshold, the computer 32 returns to the block 610, e.g., continuously monitoring the data from the tension sensor 60 to determine when the tension in the seatbelt webbing 24 is above the threshold.

At the block 630, the computer 32 determines whether a vehicle impact has been detected, e.g., within a predetermined amount of time of detecting tension above the threshold, e.g., 500 milliseconds and based on data (or a lack thereof) from the impact sensor 64. Upon determining that a vehicle impact has been detected the computer 32 moves to a block 640. Upon determining that a vehicle impact has not been detected the computer 32 moves to a block 650.

At the block 640, the computer 32 leaves the buckle 28 in the retracted position, e.g., by not commanding the actuator 30 to move the buckle 28 to the extended position. After the block 640 the process 600 may end. Alternately, the computer 32 may command other vehicle systems that typically are actuated upon determining impact detection, e.g., inflating airbags, actuating seatbelt pretensioners, etc.

At the block 650, the computer 32 actuates the actuator 30 to move the buckle 28 to the extended position, e.g., by transmitting a command specifying such position to the actuator 30 via the communication network 66. Moving the actuator 30 to the extended position may reduce tension in the seatbelt webbing 24.

Next, at a block 660, the computer 32 determines whether the latch plate 46 has been unbuckled from the buckle 28, e.g., based on data from the buckle 28 sensor. Upon determining the latch plate 46 has not been unbuckled the computer 32 moves to a block 670. Upon determining the latch plate 46 has been unbuckled the computer 32 moves to a block 690.

At the block 670, the computer 32 waits a predetermined amount of time, e.g., 500 milliseconds, and moves to a block 680.

At the block 680, the computer 32 determines whether tension of the seatbelt webbing 24 is below the predetermined threshold, e.g., based on data collected by the tension sensor 60. Upon determining the tension of the seatbelt webbing 24 is below the threshold, the computer 32 moves to the block 690. Upon determining the tension of the seatbelt webbing 24 is above the threshold, the computer 32 returns to the block 660.

At the block 690, the computer 32 actuates the actuator 30 to move the buckle 28 to the retracted position, e.g., by transmitting a command via the communication network 66. After the block 690 the process 600 may end. Alternately, the computer 32 may return to the block 610.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claimed invention.

The adjectives first and second are used throughout this document as identifiers and, unless explicitly stated otherwise, are not intended to signify importance, order, or quantity.

Computer executable instructions may be compiled or interpreted from computer 32 programs created using a variety of programming languages and/or technologies, including, without limitation, and either alone or in combination, Java, C, C, Visual Basic, Java Script, Perl, HTML, etc. In general, a processor e.g., a microprocessor receives instructions, e.g., from a memory, a computer 32 readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random-access memory, etc. A computer readable medium includes any medium that participates in providing data e.g., instructions, which may be read by a computer. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Use of in response to, based on, and upon determining herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system, comprising:
   a base;
   a buckle movable from a retracted position away from the base to an extended position;
   an actuator supported by the base and operatively coupled to the buckle to move the buckle to the extended position; and
   a computer having a processor and a memory storing instructions executable by the processor to actuate the actuator to move the buckle to the extended position in response to simultaneously determining both that tension of a seatbelt webbing is above a predetermined threshold and that a vehicle impact has not been detected.

2. The system of claim 1, wherein the instructions include instructions to actuate the actuator to move the buckle toward the base to the retracted position in response to detecting unbuckling of the buckle.

3. The system of claim 1, wherein the instructions include instructions to, after actuating the buckle to the extended position, wait a threshold amount of time and then actuate the actuator to move the buckle toward the base to the retracted position in response to determining that tension of the seatbelt is below the predetermined threshold.

4. The system of claim 1, further comprising a sensor supported at a seatbelt anchor connected to the seatbelt, the instructions including instructions to determine that tension of the seatbelt is above the predetermined threshold based on information received from the sensor.

5. The system of claim 1, further comprising an impact sensor, the instructions including instructions to determine that a vehicle impact has not been detected based on information from the impact sensor.

6. The system of claim 1, wherein the actuator includes a rack and a pinion.

7. The system of claim 6, wherein the rack is slidably supported by the base and the pinion is rotatably supported by the base.

8. The system of claim 6, wherein the actuator includes a motor operatively coupled to the pinion.

9. The system of claim 6, further comprising a lock selectively inhibiting movement of the rack.

10. The system of claim 9, wherein the lock is an inertial lock.

11. The system of claim 9, wherein the lock is operatively coupled to the pinion.

12. The system of claim 6, further comprising a connecting member extending from the base to the buckle, the rack fixed to the connecting member.

13. The system of claim 12, wherein the rack and the connecting member are unitary.

14. The system of claim 1, wherein the base is fixed to a seat bottom.

15. A system, comprising:
   a base;
   a buckle movable from a retracted position away from the base to an extended position;
   an actuator including a rack and a pinion, the actuator supported by the base and operatively coupled to the buckle to move the buckle to the extended position;
   a lock selectively inhibiting movement of the rack; and
   a computer having a processor and a memory storing instructions executable by the processor to actuate the actuator to move the buckle to the extended position in response to simultaneously determining both that tension of a seatbelt is above a predetermined threshold and that a vehicle impact has not been detected, the instructions including instructions to actuate the actuator to move the buckle toward the base to the retracted position in response to detecting unbuckling of the buckle.

16. The system of claim 15, wherein the lock is an inertial lock.

17. The system of claim 15, wherein the lock is operatively coupled to the pinion.

18. The system of claim 15, further comprising a connecting member extending from the base to the buckle, the rack fixed to the connecting member.

19. The system of claim 18, wherein the rack and the connecting member are unitary.

* * * * *